United States Patent
Hsieh

(10) Patent No.: US 8,479,025 B2
(45) Date of Patent: Jul. 2, 2013

(54) MOTHERBOARD

(75) Inventor: Ming-Chih Hsieh, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 452 days.

(21) Appl. No.: 12/953,497

(22) Filed: Nov. 24, 2010

(65) Prior Publication Data

US 2012/0106097 A1    May 3, 2012

(30) Foreign Application Priority Data

Oct. 29, 2010 (TW) .................................. 99137121

(51) Int. Cl.
     *G06F 1/00*          (2006.01)
(52) U.S. Cl.
     USPC ........................................................ 713/300
(58) Field of Classification Search
     USPC ........................................................ 713/300
     See application file for complete search history.

(56) References Cited

U.S. PATENT DOCUMENTS

| 5,943,227 A | * | 8/1999 | Bryson et al. | 363/95 |
| 6,525,516 B2 | * | 2/2003 | Schultz et al. | 323/282 |
| 2011/0121808 A1 | * | 5/2011 | Girdhar et al. | 323/311 |

* cited by examiner

*Primary Examiner* — Mark Connolly
(74) *Attorney, Agent, or Firm* — Altis Law Group, Inc.

(57) ABSTRACT

A motherboard includes a power circuit, a system power supply, and a central processor unit (CPU). The power circuit includes a direct current (DC) voltage input terminal. A first control circuit receives a direct current (DC) voltage through the DC voltage input terminal and outputs a first control signal. A second control circuit receives the first control signal and outputs a second control signal to the CPU and output a third control signal. A switching circuit includes a number of switches. The second control signal controls the corresponding switches to be on or off. A voltage converting circuit receives the third control signal and converts the DC voltage from the DC voltage input terminal, and outputs the converted DC voltage to the system power supply. The CPU receives the second control signal and controls the motherboard operation.

6 Claims, 1 Drawing Sheet

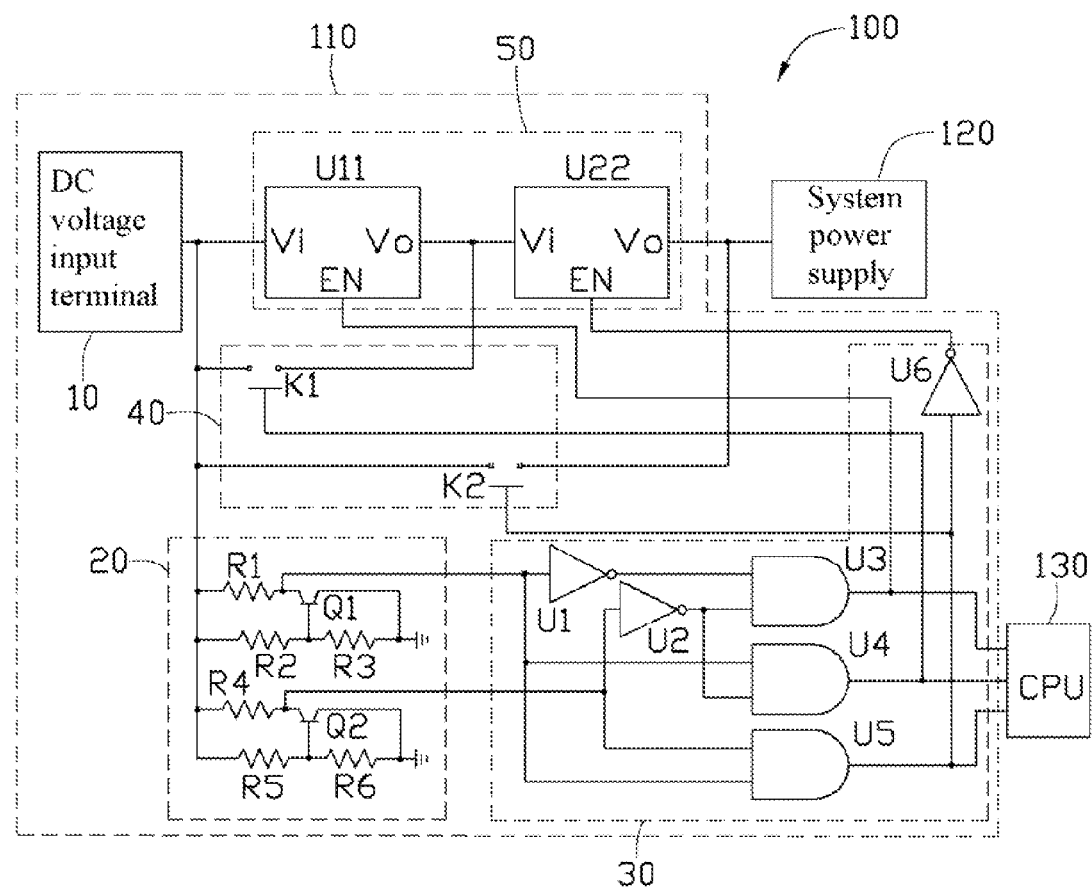

MOTHERBOARD

BACKGROUND

1. Field of the Invention

The present disclosure relates to motherboards, and particularly to a motherboard applicable in electronic devices of varying working voltage.

2. Description of Related Art

Many monitoring products, such as a Digital Video Server (DVS), network camera (IP-CAM) with a Charge-coupled Device (CCD), an IP-CAM with a Complementary Metal Oxide Semiconductor (CMOS) are in current use. However, the DVS requires a 12V DC adapter to power the video decoder, the IP-CAM with CCD requires a 5V DC adapter to power the CCD, and the IP-CAM with CMOS requires a 3.3V DC adapter to power the CMOS. Thus, three different motherboard models are required for these monitoring products, which is not cost-effective.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments. Moreover, in the drawing, like reference numerals designate corresponding parts throughout the several views.

The drawing is a circuit diagram of a motherboard sharing power supply system in accordance with an exemplary embodiment of the present disclosure.

DETAILED DESCRIPTION

The disclosure, including the drawings, is illustrated by way of example and not by limitation. It should be noted that references to "an" or "one" embodiment in this disclosure are not necessarily to the same embodiment, and such references mean at least one.

Referring to the drawing, a motherboard 100 in accordance with an exemplary embodiment includes a power circuit 110, a system power supply 120, a central processor unit (CPU) 130, and other elements (not shown). The power circuit 110 includes a direct current (DC) voltage input terminal 10, a first control circuit 20, a second control circuit 30, a switching circuit 40, and a voltage converting circuit 50. The motherboard is applicable for electronic devices of varying working voltage, such as a network camera with CCD module, a network video server with video decoder module, and a network camera with CMOS module.

The first control circuit 20 includes two electrical switches, and resistors R1-R6. In the embodiment, the electrical switches are two npn transistors Q1, Q2. A base of the transistor Q1 is connected to the DC voltage input terminal 10 through the resistor R2 and also grounded through the resistor R3. A collector of the transistor Q1 is connected to the second control circuit 30 and also connected to the DC voltage input terminal 10 through the resistor R1. A base of the transistor Q2 is connected to the DC voltage input terminal 10 through the resistor R5 and also grounded through the resistor R6. A collector of the transistor Q2 is connected to the second control circuit 30 and also connected to the DC voltage input terminal 10 through the resistor R4. Emitters of the transistors Q1 and Q2 are grounded.

The second control circuit 30 includes three NOT gates U1, U2, and U6, and three AND gates U3-U5. An input terminal of the NOT gate U1 is connected to the collector of the transistor Q1, a first input terminal of the AND gate U4, and a second input terminal of the AND gate U5. An output terminal of the NOT gate U1 is connected to a first input terminal of the AND gate U3. An input terminal of the NOT gate U2 is connected to the collector of the transistor Q2 and a first input terminal of the AND gate U5. An output terminal of the NOT gate U2 is connected to a second input terminal of the AND gate U3 and a second input terminal of the AND gate U4. An output terminal of the AND gate U3 is connected to the voltage converting circuit 50 and the CPU 130. An output terminal of the AND gate U4 is connected to the switching circuit 40 and the CPU 130. An output terminal of the AND gate U5 is connected to the switching circuit 40, the CPU 130, and an input terminal of the NOT gate U6. An output terminal of the NOT gate U6 is connected to the voltage converting circuit 50.

The switching circuit 40 includes two switches K1 and K2. Each of the switches K1 and K2 includes first to third terminals. The first terminal of the switch K1 is connected to the output terminal of the AND gate U4. The second terminal of the switch K1 is connected to the DC voltage input terminal 10. The third terminal of the switch K1 is connected to the voltage converting circuit 50. The first terminal of the switch K2 is connected to the output terminal of the AND gate U5. The second terminal of the switch K2 is connected to the DC voltage input terminal 10. The third terminal of the switch K2 is connected to the system power supply 120. The first to third terminals of the switch K1 are connected together to close the switch K1 when the first terminal of the switch K1 receives a high level signal. The first to third terminals of the switch K2 are connected together to close the switch K2 when the first terminal of the switch K2 receives a high level signal.

The voltage converting circuit 50 includes two direct current (DC) voltage converters U11 and U22. An input terminal Vi of the DC voltage converter U11 is connected to the DC voltage input terminal 10. An enable terminal EN of the DC voltage converter U11 is connected to the output terminal of the AND gate U3. An output terminal Vo of the DC voltage converter U11 is connected to the third terminal of the switch K1 and an input terminal Vi of the DC voltage converter U22. An enable terminal EN of the DC voltage converter U22 is connected to the output terminal of the NOT gate U6. An output terminal Vo of the DC voltage converter U22 is connected to the third terminal of the switch K2 and the system power supply 120.

In the following, "0" represents a low level signal and "1" a high level signal.

When the motherboard 100 is used in a network camera with CCD module, the DC voltage input terminal 10 receives 12V voltage from a power supply and the transistors Q1 and Q2 are turned on. The collector of the transistor Q1 outputs a low level signal "0" to the input terminal of the NOT gate U1, the first input terminal of the AND gate U4, and the second input terminal of the AND gate U5. The output terminal of the NOT gate U1 outputs a high level signal "1" to the first input terminal of the AND gate U3. The collector of the transistor Q2 outputs a low level signal "0" to the input terminal of the NOT gate U2 and the first input terminal of the AND gate U5. The output terminal of the NOT gate U2 outputs a high level signal "1" to the second inputs of the AND gates U3 and U4. The output terminals of the AND gates U3-U5 respectively output signals "1", "0", and "0". The enable terminal EN of the DC voltage converter U11 receives the high level signal "1" from the AND gate U3 and converts the 12V voltage from the DC voltage input terminal 10 to 5V. The first terminal of the switch K1 receives the low level signal "0" from the AND gate U4 and the first switch K1 is off so that the 12V voltage from the DC voltage input terminal 10 is not provided to the DC voltage converter U22. At the same time, the first terminal of the switch K2 receives the low level signal "0" from the AND gate U5 and the switch is off so that the 12V voltage from the DC voltage input terminal 10 is not provided to the system power supply 120. The NOT gate U6 receives the low level signal "0" from the AND gate U5 and outputs a high level signal "1" to the enable terminal EN of the DC voltage converter U22. The DC voltage converter U22 converts the 5V voltage from the DC voltage converter U11 to a 3.3V voltage to be provided to the system power supply 120, the working voltage of the motherboard 100. The CPU 130 identifies the network camera with CCD module according to the signals "100" from the AND gates U3-U5.

When the motherboard 100 is used in a network video server with video decoder module, the DC voltage input terminal 10 receives 5V voltage and the transistor Q1 is turned off and the transistor Q2 is turned on. The collector of the transistor Q1 outputs a high level signal "1" to the input terminal of the NOT gate U1, the first input terminal of the AND gate U4, and the second input terminal of the AND gate U5. The output terminal of the NOT gate U1 outputs a low level signal "0" to the first input terminal of the AND gate U3. The collector of the transistor Q2 outputs a low level signal "0" to the input terminal of the NOT gate U2 and the first input terminal of the AND gate U5. The output terminal of the NOT gate U2 outputs a high level signal "1" to the second inputs of the AND gates U3 and U4. The output terminals of the AND gates U3-U5 respectively output signals "0", "1", and "0". The enable terminal EN of the DC voltage converter U11 receives the low level signal "0" from the AND gate U3 to disable the DC voltage converter U11. The first terminal of the switch K1 receives the high level signal "1" from the AND gate U4 and the switch K1 is on so that the 5V voltage from the DC voltage input terminal 10 is provided to the DC voltage converter U22. At the same time, the first terminal of the switch K2 receives the low level signal "0" from the AND gate U5 and the switch K2 is off, such that the 5V voltage from the DC voltage input terminal 10 is unavailable to the system power supply 120. The NOT gate U6 receives the low level signal "0" from the AND gate U5 and outputs a high level signal "1" to the enable terminal EN of the DC voltage converter U22 to enable the DC voltage converter U22. The DC voltage converter U22 converts the 5V voltage to a 3.3V voltage to be provided to the system power supply 120. The CPU 130 identifies the network video server with video decoder module according to the signal "010" from the AND gates U3-U5.

When the motherboard 100 is used in a network camera with CMOS module, the DC voltage input terminal 10 receives a 3.3V voltage and the transistors Q1 and Q2 are turned off. The collector of the transistor Q1 outputs a high level signal "1" to the input terminal of the NOT gate U1, the first input terminal of the AND gate U4, and the second input terminal of the AND gate U5. The output terminal of the NOT gate U1 outputs a low level signal "0" to the first input terminal of the AND gate U3. The collector of the transistor Q2 outputs a high level signal "1" to the input terminal of the NOT gate U2 and the first input terminal of the AND gate U5. The output terminal of the NOT gate U2 outputs a low level signal "0" to the second inputs of the AND gates U3 and U4. The output terminals of the AND gates U3-U5 respectively output signals "0", "0", and "1". The enable terminal EN of the DC voltage converter U11 receives the low level signal "0" from the AND gate U3 to disable the DC voltage converter U1. The first terminal of the switch K1 receives the low level signal "0" from the AND gate U4 and the switch K1 is off so that the DC voltage converter U22 is incapable of receiving the 3.3V voltage from the DC voltage input terminal 10. At the same time, the NOT gate U6 receive the high level signal "1" from the AND gate U5 and outputs a low level signal "0" to the enable terminal EN of the DC voltage converter U22 to disable the DC voltage converter U22. The first terminal of the switch K2 receives the high level signal "1" from the AND gate U5 and the switch K2 is on so that the system power supply 120 directly receives the 3.3V voltage from the DC voltage input terminal 10. The CPU 130 identifies the network camera with CMOS module according to the signals "001" from the AND gates U3-U5.

The motherboard 100 can be applied in the DVS with video decoder, the IP-CAM with CCD module, and the IP-CAM with CMOS module, to save cost.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A motherboard applicable in electronic devices, the motherboard comprising a power circuit, a system power supply, and a central processor unit (CPU), the power circuit comprising:
    a direct current (DC) voltage input terminal;
    a first control circuit to receive a direct current (DC) voltage corresponding to one kind of electronic device through the DC voltage input terminal and output a first control signal;
    a second control circuit to receive the first control signal from the first control circuit and output a second control signal to the CPU and output a third control signal;
    a switching circuit comprising a plurality of switches, the second control signal output from the second control circuit to control the corresponding switches of the switching circuit on or off; and
    a voltage converting circuit to receive the third control signal from the second control circuit and convert the DC voltage from the DC voltage input terminal, and output the converted DC voltage to the system power supply of the motherboard, wherein the CPU receives the second control signal from the second control circuit and controls the motherboard operation according to the received second control signal.

2. The motherboard as claimed in claim 1, wherein the first control circuit comprises first and second electrical switches and first to sixth resistors, a first terminal of the first electrical switch is connected to the DC voltage input terminal through the second resistor and also grounded through the third resistor, a second terminal of the first electrical switch is connected to the second control circuit and also connected to the DC voltage input terminal through the first resistor, a first terminal of the second electrical switch is connected to the DC voltage input terminal through the fifth resistor and also grounded through the sixth resistor, a second terminal of the second electrical switch is connected to the second control circuit and also connected to the DC voltage input terminal through the fourth resistor, third terminals of the first and the second electrical switches are grounded.

3. The motherboard as claimed in claim 2, wherein the first and the second electrical switches are npn transistors, the first to the third terminals of the first and the second electrical switches are corresponding to bases, collectors, and emitters of the npn transistors.

4. The motherboard as claimed in claim 2, wherein the second control circuit comprises first to third NOT gates and first to third AND gates, an input terminal of the first NOT gate is connected to the second terminal of the first electrical switch, a first input terminal of the second AND gate, and a second input terminal of the third AND gate, an output terminal of the first NOT gate is connected to a first input terminal of the first AND gate, an input terminal of the second NOT gate is connected to the second terminal of the second electrical switch and a first input terminal of the third AND gate, an output terminal of the second NOT gate is connected to a second input terminal of the first AND gate and a second input terminal of the second AND gate, an output terminal of the first AND gate is connected to the voltage converting circuit and the CPU, an output terminal of the second AND gate is connected to the switching circuit and the CPU, an output terminal of the third AND gate is connected to the switching circuit, the CPU, and an input terminal of the third NOT gate, an output terminal of the third NOT gate is connected to the voltage converting circuit.

5. The motherboard as claimed in claim 4, wherein the switching circuit comprises first and second switches, each of the first and the second switches comprises a first terminal, a second terminal, and a third terminal, the first terminal of the first switch is connected to the output terminal of the second AND gate, the second terminal of the first switch is connected to the DC voltage input terminal, the third terminal of the first switch is connected to the voltage converting circuit, the first terminal of the second switch is connected to the output terminal of the third AND gate, the second terminal of the second switch is connected to the DC voltage input terminal, the third terminal of the second switch is connected to the system power supply, the first to third terminals of the first switch are connected together to close the first switch when the first terminal of the first switch receives a high level signal, the first to third terminals of the second switch are connected together to close the second switch when the first terminal of the first switch receives a high level signal.

6. The motherboard as claimed in claim 5, wherein the voltage converting circuit comprises first and second direct current (DC) voltage converters, an input terminal of the first DC voltage converter is connected to the DC voltage input terminal, an enable terminal of the first DC voltage converter is connected to the output terminal of the first AND gate, an output terminal of the first DC voltage converter is connected to the third terminal of the first switch and an input terminal of the second DC voltage converter, an enable terminal of the second DC voltage converter is connected to the output terminal of the third AND gate, an output terminal of the second DC voltage converter is connected to the third terminal of the second switch and the system power supply.

* * * * *